Figure 1:
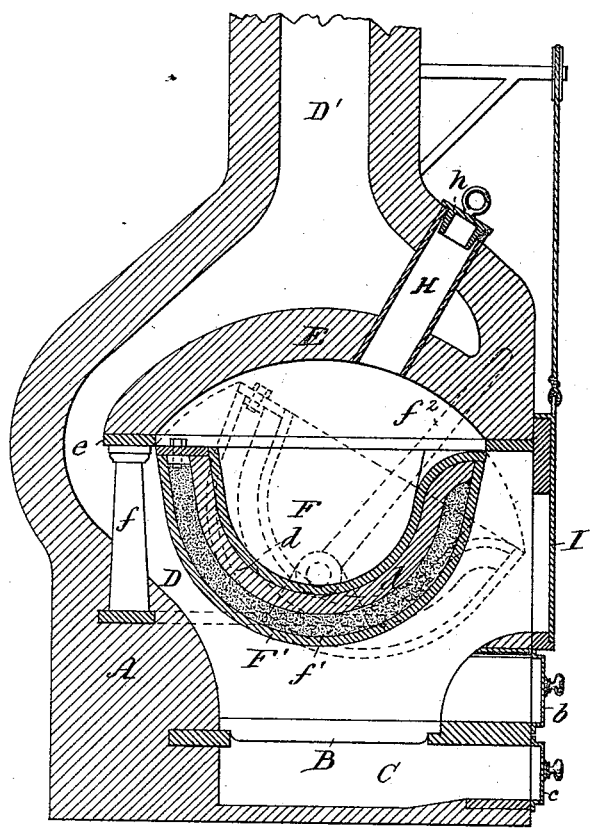

(No Model.)  3 Sheets—Sheet 1.

C. PAYEN.
ART OF PRODUCING CRYSTALLIZED METAL PLATES.

No. 440,270.  Patented Nov. 11, 1890.

WITNESSES:

INVENTOR:

(No Model.) 3 Sheets—Sheet 2.
C. PAYEN.
ART OF PRODUCING CRYSTALLIZED METAL PLATES.
No. 440,270. Patented Nov. 11, 1890.
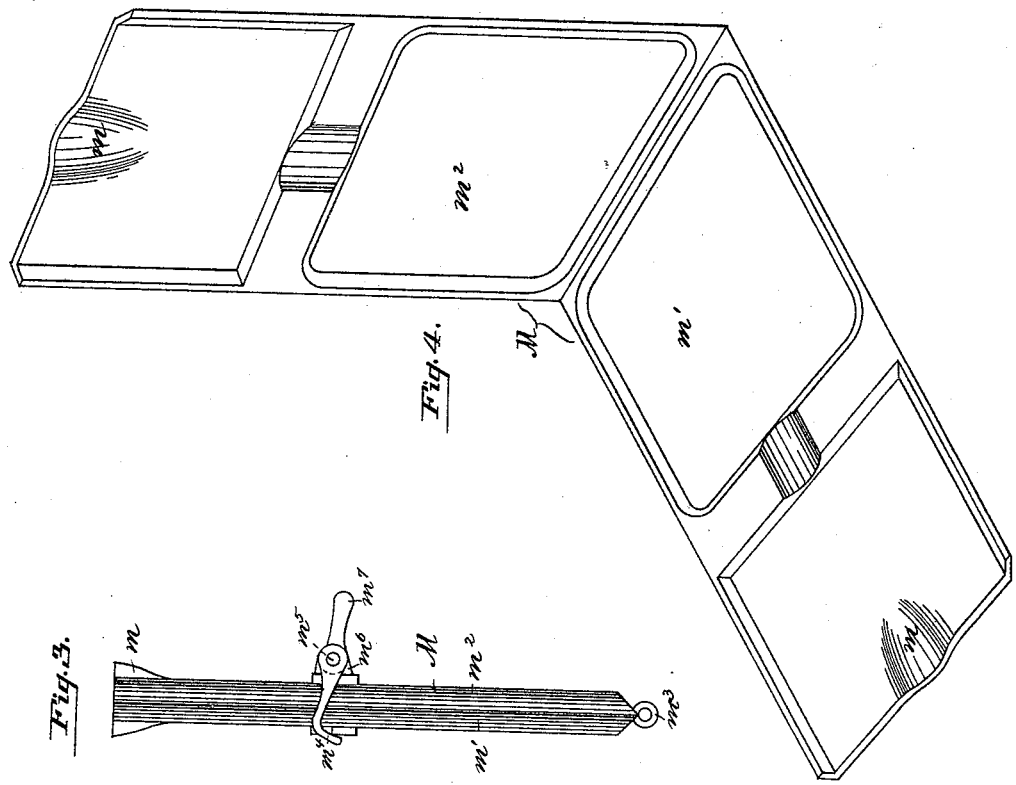
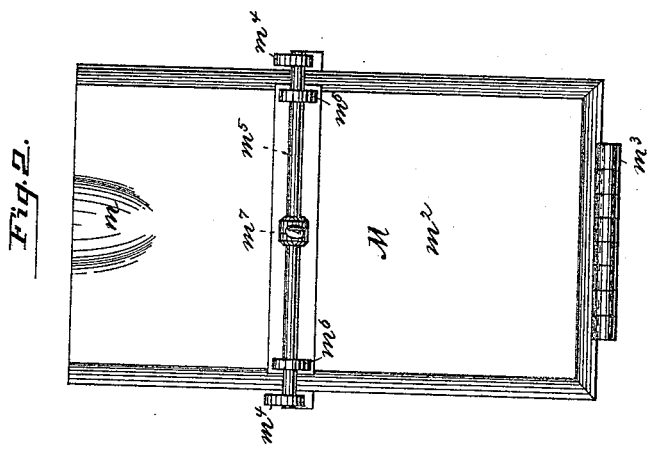
WITNESSES:
INVENTOR:
Clement Payen,
By J. Walter Douglass.
Atty.

(No Model.) 3 Sheets—Sheet 3.
C. PAYEN.
ART OF PRODUCING CRYSTALLIZED METAL PLATES.
No. 440,270. Patented Nov. 11, 1890.
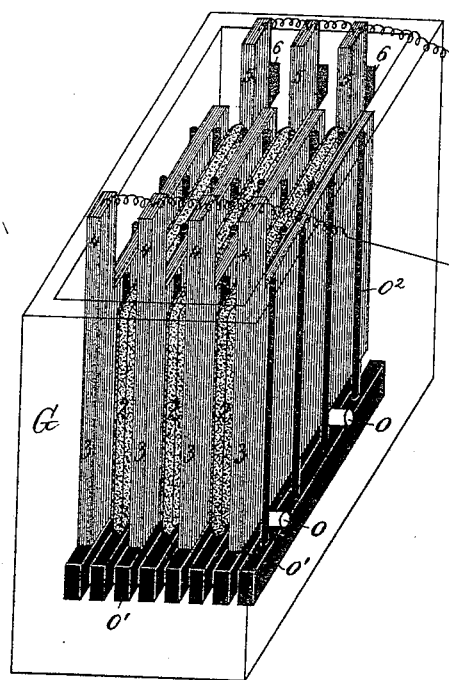
Fig. 5.
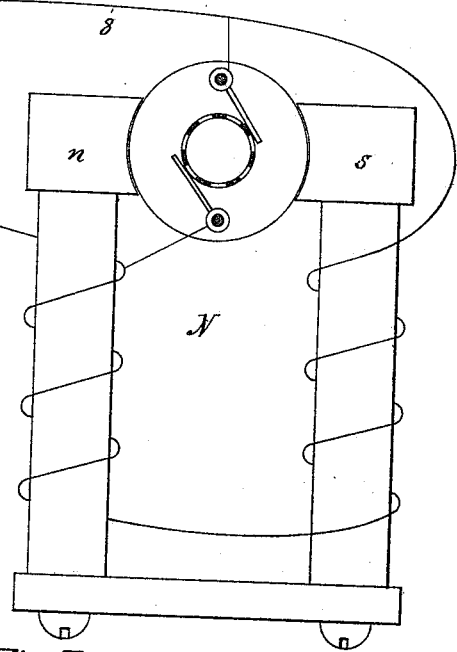
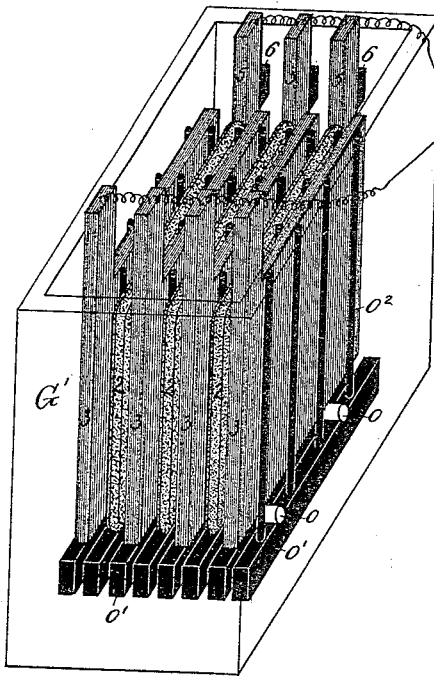
Fig. 6.
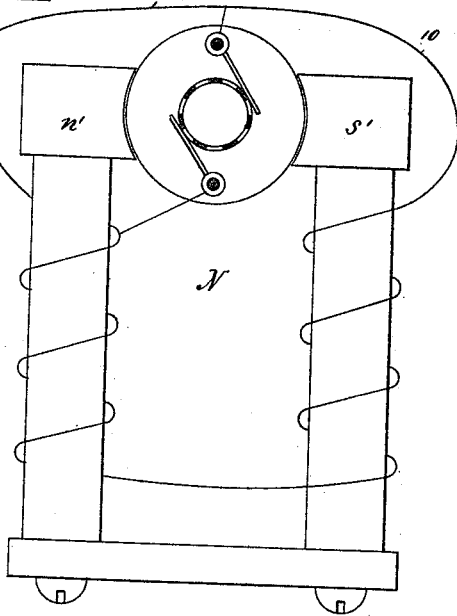
WITNESSES:
Hermann Bormann.
Thomas M. Smith.
INVENTOR
Clement Payen,
By J. Walter Douglass.
Atty.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

ART OF PRODUCING CRYSTALLIZED METAL PLATES.

SPECIFICATION forming part of Letters Patent No. 440,270, dated November 11, 1890.

Application filed March 12, 1888. Serial No. 266,949. (No specimens.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Art of Producing Crystallized Metal Plates, &c., of which the following is a specification.

My invention relates to the production of porous crystallized metal plates for use as the elements of a secondary or storage battery.

My invention consists in subjecting to fusion the salt of a metal having the salt of another metal and a metal or a salt of that metal combined therewith, then causing the mass in cooling to assume a crystallized form, and then reducing the same to a metallic state, whereby is produced a strong porous crystallized plate or other structure.

In the production of a plate or other structure according to my invention it is well to select a salt which will not be subject to decomposition by the action of heat before the point of fusion is reached, and it is also well to select a salt that may be melted at a low temperature. Furthermore, the salt selected should not be of a too volatile nature. In some instances it will be necessary to combine with the base salt another salt and a metal or a salt of that metal, whether the base salt is too volatile or not, because without such the crystallized metal structure produced would be apt to be fragile, so that it would be impaired to a greater or less extent for subsequent use.

In order that my invention may be fully understood, I will now proceed to describe the manner of conducting the process for the production of a crystallized metal plate or other structure, and will then describe with greater particularity the manner of producing a crystallized metal lead plate of any desired size and form.

Under the general method a charge of nitrate of silver is melted or fused in a suitable furnace and then discharged into a mold, wherein in a short time the mass in cooling assumes a crystallized form. When the crystallized structure has become more or less cool, it is removed for reduction to a metallic state preferably by electrolysis in the following manner: A series of crystallized nitrate structures treated in the above manner is now mounted in a vase containing sulphuric acid and water, the crystallized nitrate plates being alternated with plates of equal dimension composed of charcoal, lead, or other metal with lugs, care being taken in the mounting of the respective plates in the vase to see that each is properly insulated from the other and also from the vase, and, moreover, that the plates are firmly held therein, so that all wabbling is obviated, whereby warping of the crystallized plates in the process of reduction to a metallic state will be entirely prevented. The two systems of plates having been mounted in the vase and properly insulated from each other therein, bars of lead or other material are fitted snugly up against one of the edges of each nitrate plate and held in position by means of insulating-strips introduced between said bars and said vase. A wire is then connected with each of the bars in contact with the system of crystallized nitrate plates and another wire in a similar manner connected with the lugs of the system of charcoal or metal plates, and the two wires connected, respectively, with the positive and negative electrodes of a dynamo—that is, the positive electrode being connected through the first wire with the system of charcoal of metal plates, while the negative electrode is connected through the second wire with the system of crystallized nitrate plates, and in consequence of the electrolysis which takes place the nitrate is decomposed into its two gases—azote (nitrogen) and oxygen—and these two gases escaping into the open air, thereby leaving the cystallized plates in a metallic state with porosity. The crystallized metal silver plates may then be removed from the vase and washed, and thereby brought to a chemically-pure state of perfection, having substantial strength for use as filters and many other purposes.

In the accompanying drawings I have illustrated a plant for the conduct of the several steps of my process in forms which have been found practically efficient for economically producing metal structures, in which—

Figure 1 is a vertical central section through a melting-furnace of my improved construction, showing the crucible pivotally supported therein. Fig. 2 is a top or plan view of a mold made in two sections hinged together. Fig. 3 is an end view showing the means for clamping the two sections constituting the mold together. Fig. 4 is a perspective view showing the shape and interior formation of the sectional mold, and Figs. 5 and 6 are diagrammatic views showing the first and second electrolysis for reducing the crystallized plates to a metallic state.

Referring to the accompanying drawings, A is the furnace, constructed of brick or other suitable material.

B is the grate located and supported in the lower part of the furnace, and access thereto being had by means of a door $b$ for firing or other purposes. Beneath the grate B is an ash-pit C, closed from the outside by means of a door $c$.

D is the draft-flue leading to the chimney D′.

E is an arch, made of brick or other refractory material, in the upper portion of the furnace, which is supported in position on a ring $e$, held in position by means of columns $f$, arranged and supported in the brick-work of the furnace in any suitable manner.

F is a porcelain crucible or melting-pot open at the top, around the outer circumference of which is formed a layer or capsule $d$, of amianthus, asbestos, or other material, and between the capsule $d$ and the metal-pot F′ is a film or layer of sand $f'$ of any desired thickness. This metallic capsule is pivotally supported in a central position within the furnace, and is operated from the outside by a lever $f^2$, attached to one of the journals of the metal-pot F′, whereby the crucible may be readily tilted for discharging the contents thereof into a receptacle for further treatment.

H is an inclined hopper, with a stopper $h$, which is removable for the purpose of charging the material into the crucible F.

I is a door, which may be raised or lowered by simple means to allow of the discharge of the melted mass into a mold for causing the same to assume a crystallized form.

The characteristic features of the melting-furnace having been described, I will now proceed to describe the manner of producing a crystallized metal lead plate by one of the methods of my invention.

I take a charge of chloride of lead and to which I add two per cent., by weight, of chloride of zinc or metallic zinc, more or less, and two per cent., by weight, of chloride of cadmium or metallic cadmium or other metal, more or less, and these chlorides and metal or metals may be added before or during the fusing of the charge of chloride of lead; but I give preference to the admixture of the chloride of zinc, or metallic zinc or chloride of cadmium or metallic cadmium or both chlorides and the metal or metal and metals, gradually during the fusing of the charge of chloride of lead in the crucible F. The percentage of chloride of zinc or chloride of cadmium, or of both chlorides and metal or metals, will in each case depend upon the degree of porosity desired in the finished product. Furthermore, as the percentage of the chlorides or salts of the metals and metal or metals added or combined with the charge of chloride of lead is increased or diminished, so will the strength and porosity of the finished product be increased or diminished. The above-mentioned combined mass having been fused in the crucible F, the sliding door I is raised and the crucible tilted by means of the lever $f^2$ sufficiently to permit of the discharge of the contents into a mold M through the mouth $m$ thereof, and in a few minutes thereafter in the cooling the mass or compound will assume a crystallized form.

It is well to select material for the mold M, and it is important that the interior thereof should be perfectly smooth. The mold to which preference is given is one made of either brass or bronze and composed of two symmetrical sections $m'$ and $m^2$, chamfered, as shown in Fig. 4. The two sections of the mold are hinged at $m^3$ to each other and held firmly by catches $m^4$, which are secured to the extremity of a shaft $m^5$, held in bearings $m^6$, formed with one of the sections and operated by a lever $m^7$, as shown in Figs. 2 and 3. This mold may be constructed so that each section will be of a uniform thickness of metal, and the thickness of each section varying according to the dimensions of the crystallized plate to be formed.

In the pouring of a fused mass into a mold in which the two parts thereof are of equal thicknesses of metal such mass will commence to cool from each side, and the crystals composing said mass will meet or unite with each other at their summits, sides, or facets, forming columns with geometrical regularity uniformly throughout the mass solidifying—that is, the crystals assuming such geometrical regularity in parallel columns to each other from one side of the mold will meet or unite with the crystals forming like columns with similar regularity from the opposite side of the mold at the median line of the crystallized structure. When a mold is used having the two parts or sides of unequal thicknesses of metal, the fused mass charged into the mold will cool therein unequally, thereby causing the individual crystals (while forming with geometrical regularity in parallel columns) to assume a fixed position in the structure faster from the side of the mold having the greater thickness of metal than the crystals assuming a fixed position in the plate from the opposite side of the mold of a less thickness of metal—that is, the crystals from one side of the mold will meet or unite with each other, forming columns with those meeting or uniting with each other and forming columns from the opposite side of the mold—and these columns of crystals thus formed will unite with each other from both sides of the mold beyond the median line of the plate or structure.

When the combined mass has assumed a solid crystalline form in the mold M in substantially the manner described and the plate has cooled off completely, it may then be removed for further treatment in the following manner: In a vase G, containing sulphuric acid and water in the proportion of ten per cent. of sulphuric acid, more or less, a series of the crystallized chloride plates may be mounted upon glass insulators $o$, held in the grooves of a series of bars $o'$, made of rubber or other insulating material, and with vertical bars $o^2$ of similar material formed integral therewith, the system of crystallized chloride-of-lead plates 2, mounted in the vase G, being alternated with plates 3 of equal dimensions composed of lead, charcoal, or other material, with lugs forming conductors 4. Against one edge of each of the crystallized plates 2 is placed a bar of lead or other material forming a conductor 5, and which bars are held to place by means of strips of rubber 6 or other material. These two systems of plates, properly insulated from each other and the vase G, should be mounted therein without play, so that all bulging, warping, or cracking of the crystallized chloride plates may be obviated, which is quite important, because any bulging or warping taking place during the process of reduction of the chloride plates to a metallic state would, to a greater or less extent, impair their utility for subsequent use. The two systems of plates having been mounted in the vase G in the manner described, the wires 7 and 8 in contact with the conductors 4 and 5 are connected with the positive and negative electrodes of a dynamo N, the system of crystallized chloride plates 2 being connected through the wire 8 with the negative electrode $s$ of the dynamo N, while the system of lead, charcoal, or other plates are connected through the wire 7 with the positive electrode $n$ of the dynamo N, and in consequence of the electrolysis which thus takes place the oxygen and chlorine will be separated and caused to attack the system of lead, charcoal, or other plates, while on the system of crystallized plates will remain zinc and cadmium or other material or materials that may have been mixed or combined with the charge, but in a metallic state. The crystallized metal lead plates still containing cadmium and zinc or other materials in a metallic state may then be removed from the vase G into a similar vase G', containing sulphuric acid and water in about the same proportion as above described. In this second vase G' the crystallized plates are again alternated with others of ordinary lead or artificial charcoal, as in the previous instance. The two systems of plates properly insulated from each other and the vase G' are again connected through two separate wires 9 and 10, with the positive and negative electrodes of the dynamo N', as in the first instance described, but with this difference, that the negative electrode is connected with the system of lead or charcoal plates, while the positive electrode is connected with the system of crystallized plates, as illustrated in Fig. 6. By the second electrolysis which takes place the zinc and cadmium or other metallic materials are deposited on the lead or charcoal plates. By removing the crystallized metal plates thus treated and washing the same in any convenient manner they will be brought to a chemically-pure state of perfection with substantial strength for various purposes.

In the applications for Letters Patent Serial Nos. 260,900, 267,400, and 277,134 the same process is described as in this application; but the invention is not claimed herein in the same manner.

Having thus described the nature and objects of my invention, what I claim as new, and desire to secure by Letters Patent, is—

1. The method of producing a crystallized metal plate, which consists in subjecting to fusion the salt of a metal having the salt of another metal and a metal or a salt of that metal mixed or combined therewith, then pouring the fused mass into a mold and allowing it to cool and crystallize in columns therein, and then reducing the cast plate to a metallic state, substantially as and for the purposes set forth.

2. The method of producing a porous crystallized metal plate, which consists in subjecting to fusion the salt of a metal having the salt of another metal and a metal or a salt of that metal mixed or combined therewith, then pouring the fused mass into a mold and allowing it to cool and become crystallized with geometrical regularity in columns therein, and then reducing electrolytically the cast plate to a metallic state and eliminating therefrom matter not forming a component part of the metal required, substantially as and for the purposes set forth.

In witness whereof I have hereunto set my hand in the presence of two subscribing witnesses.

CLÉMENT PAYEN.

Witnesses:
CHAS. HART,
GEO. W. REED.